Sept. 27, 1966 C. F. PULVARI 3,274,828
FORCE SENSOR
Filed Aug. 27, 1963 4 Sheets-Sheet 1

INVENTOR
Charles F. Pulvari
BY Spencer & Kaye
ATTORNEYS

Sept. 27, 1966   C. F. PULVARI   3,274,828
FORCE SENSOR

Filed Aug. 27, 1963   4 Sheets-Sheet 2

INVENTOR
Charles F. Pulvari
BY *Spencer & Kaye*
ATTORNEYS

Sept. 27, 1966 C. F. PULVARI 3,274,828
FORCE SENSOR
Filed Aug. 27, 1963 4 Sheets-Sheet 4

INVENTOR
Charles F. Pulvari
BY Spencer & Kaye
ATTORNEYS

United States Patent Office 3,274,828
Patented Sept. 27, 1966

3,274,828
FORCE SENSOR
Charles F. Pulvari, 2014 Taylor St. SE., Washington, D.C.
Filed Aug. 27, 1963, Ser. No. 304,852
11 Claims. (Cl. 73—141)

The present invention relates generally to the art of sensing and/or determining the magnitude of forces, and, more particularly, to a force sensor using high accuracy time standards.

The united space, time and mass tensor of Einstein implies that any one of these three parameters is intimately connected to the others. This suggests that if a distance or force, which can be visualized as being actually related to the mass, is to be determined with high accuracy, this may be accomplished if a means exists for determining at least one of the three parameters with a high degree of accuracy. Therefore, a highly accurate time standard should provide a possible means to determine with an equal degree of accuracy either distances or forces. For this reason, it should also be capable of measuring extremely small distances in the order of a few lattice constants. Highly accurate time standards, such as piezoelectric quartz oscillators or solid state laser oscillators change their frequency with temperature and they change their frequency upon the application of a force.

A large number of force sensors have been previously developed and most of them are capable of measuring only dynamic changes of forces and for this reason they are referred to as accelerometers. It is well known that the frequency of a secondary time standard, such as a quartz resonator or solid state laser oscillator, varies with temperature. There has been much effort and work devoted to eliminate this temperature dependence of the frequency within a temperature region of usefulness. This was accomplished by placing the crystal oscillator in a constant temperature furnace in which the temperature was highly controlled. Because of the inconvenience, space and weight involved with this type of frequency control, it has been proposed that the frequency of a quarz resonator plate be stabilized using a temperature dependent compressional force on an AT-cut resonator instead of a constant temperature furnace. However, there were difficulties with this proposal because the frequency change effected by the application of a force is a linear function of the applied force, whereas the temperature dependence of frequency upon temperature for an AT-cut resonator is a non-linear relationship.

With the prior art in mind, it is a main object of the present invention to provide a force sensor which detects and may measure static forces, as well as small distances, electronically.

Another object of the invention is to provide a device which utilizes the linear relationship between the frequency change of a secondary time standard, such as a piezo-electric stabilized oscillator or a solid-state laser oscillator, and the applied force and provide an automatic compensation for the non-linear temperature dependence which previously rendered it impossible to use a piezo-electric resonator for this purpose.

Another object of the present invention is to provide a device of the character described, wherein a force may be applied to a piezo-electric resonator in such a manner that whenever the force exceeds a predetermined value, there will be no further increase in the applied force to the piezo-electric resonator.

Still another object of the invention is to provide a force sensor which is extremely reliable and which it is very difficult to damage.

Still a further object of this invention is to provide a device of the character described which is entirely free of frequency variation with temperature.

Yet another object of the present invention is to provide a device as described which provides a digital signal as an output which is linearly proportional to the applied force.

Yet a further object of this invention is to provide measurements of force which are extremely accurate.

These objects and others ancillary thereto are accomplished in accordance with preferred embodiments of the invention which are based upon the principle that the frequency of an oscillating time standard is affected by externally applied stress. Examples of oscillating time standards are the piezo-electric quartz oscillator, known as a secondary time standard, and the solid-state laser oscillator, known also as the injection laser oscillator or light frequency-emitting diode generating coherent stable frequency light, the frequency of which can be tuned by the application of a mechanical force. A feature of the invention is the utilization of this effect to the maximum extent in that the compressional or tensional stress is applied in a specific direction in a plane of an oscillating time standard.

In one embodiment of the invention, two identical piezo-electric oscillators each of which represents a high grade secondary frequency standard, are used and the two frequencies thereof are mixed in a mixer to obtain a difference frequency between the two in such a manner that without the application of any force on the crystal resonators, the beat frequency is set to zero. The use of two identical oscillators both of which have the stability of a primary or secondary standard to provide a variation of the beat frequency as an indication of the applied force on the piezo-electric resonators yields two unexpected and unique improvements over any previously used method. The first is that frequency variation with temperature is entirely eliminated because the basic frequency of both piezo-electric oscillators is so selected that they vary with temperature in an identical manner. Therefore, the beat frequency remains zero, regardless of the changes in the ambient temperature, so long as both oscillators are maintained at an identical temperature or in the same environment. The second improvement is that the appropriate application of a force on the piezo-electric resonator produces a beat frequency which supplies a digital signal linearly proportional to the applied force. This digital signal may be directly supplied into a computer, counter, or any other data processing device.

In another embodiment of the invention use is made of the relationship between the frequency change of a solid-state laser oscillator, such as a light frequency emitting diode which generates coherent stable frequencies of light. The frequency thereof can be tuned by the application of a mechanical force and provides an automatic compensation for the frequency variation with temperature.

Two identical light emitting diode oscillators each of which represents a high grade first or secondary frequency standard may be used and the two light frequencies mixed in a photoelectric or crystal mixer to obtain a difference frequency in such a manner that when no force is applied on the crystal oscillator the beat frequency is either constant or is set to zero.

The use of two identical twin oscillators both of which have the stability of a primary or secondary frequency standard allows utilization of the variation of the beat frequency for an indication of the applied force on the light emitting diode oscillator so that in a manner similar to the use of the piezo-electric oscillators the frequency variation with temperature is entirely eliminated because the basic frequencies of both light emitting diode oscillators vary with temperature in an identical manner. Therefore, the beat frequency remains constant or zero regardless of how the ambient temperature changes so long as both oscillators are maintained at the same temperature or in the same environment. Furthermore, the appropriate application of a force on the faces of the light emitting diode oscillators produces a beat frequency which supplies a digital signal linearly proportional to the applied force and this may be utilized directly in a data processing device.

Additional objects and advantages of the present invention will become apparent upon consideration of the following description when taken in conjunction with the accompanying drawings in which:

FIGURE 12 illustrates a modification of the FIGURE 11 arrangement, and wherein

FIGURE 12a is a front view, while

FIGURE 12b is a side view thereof.

FIGURE 14 illustrates still another embodiment wherein force transfer is accomplished by electrostatic means and wherein FIGURE 14a is a side view and FIGURE 14b is a front view.

Figure 1:
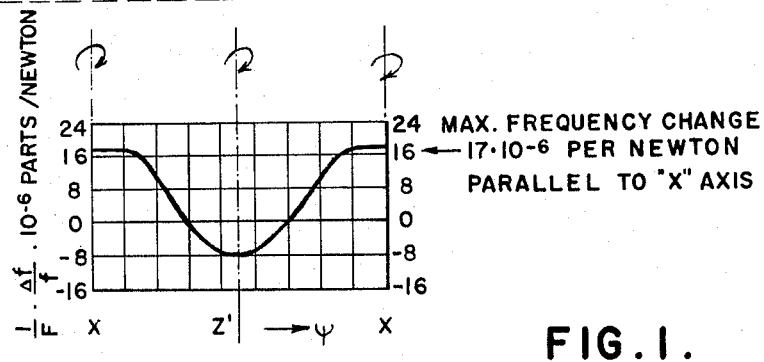
FIGURE 1 is a graph indicating the relative frequency change per unit of applied force as a function of the azimuth.

With more particular reference to the drawings, FIGURE 1 indicates the relative frequency change per unit of applied force on an AT-cut quartz resonator plate as a function of the azimuth $\phi$. This graph clearly indicates that when the compressional force is applied parallel to the X-axis, the frequency change attains its maximum value of $17 \cdot 10^{-6}$ for one Newton, and $-8 \cdot 10^{-6}$ for one Newton for a force which is parallel to the Z' axis.

Figure 2:
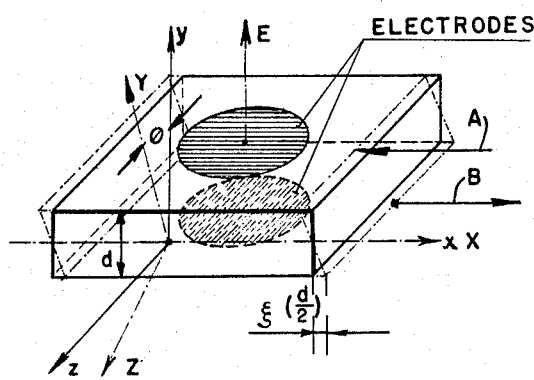
FIGURE 2 is a diagrammatic perspective view of a quartz plate.

FIGURE 2 illustrates the ideal thickness shear mode oscillation of a quartz plate wherein the y-axis is normal to the plate, and the Z, X-axes are in the plane of the plate. X is the polar axis in which direction the force is to be applied and Z is the optical axis of the quartz crystal or may be used to determine the relative positions of the axes by using polarized light. Thickness shear mode oscillators are provided by cutting the plates about the X-axis rotated out from the X, Z plane with an angle $\phi$. For an AT-cut crystal $\phi=35°$ and for a BT-cut crystal $\phi=-49°$. The exciting field E of the crystal is parallel to the y-axis. When excited the plate oscillates with the shear amplitude $\xi$ $(d/2)$ about the neutral plane which is disposed $(d/2)$ distance from the upper surface of the plate and the oscillation is indicated by the arrows A and B.

A stress and strain relationship is established along the X direction if a force is applied in this direction and the oscillations will be impeded within the electrode areas. The effect of this will manifest itself as though the mass of the crystal had been increased, and as a result the eigen frequency of the crystal shifts from its initial unloaded frequency $f$. The frequency change $\Delta f$ is a linear function of the applied force and is used for sensing the force. It should be noted that FIGURE 2 serves only for explanatory purposes. Actually the whole wafer does not oscillate as shown in FIGURE 2 when the exciting field is applied to the electrodes. Exact measurements have revealed that the oscillations of the plate extend for an extremely small distance beyond the electrode areas and as a good approximation those portions of the oscillating plate which are outside of the electrode areas practically do not oscillate and as a consequence the energy density of oscillation at these areas is nearly zero.

According to this invention it was visualized that if a force to be measured is applied on those portions of the plate in an appropriate direction in which the appropriate propagation wave vector of the oscillations due to the exponential decay of energy density away from the resonator becomes nearly zero, the high Q operation of the resonator below the electrode areas themselves remains practically unaffected, and extremely high sensitivities of force measurements become possible. It can be mathematically shown that the behaviour of a resonator depends on whether the actual frequency of oscillation is higher, equal or lower than the eigen frequency or natural frequency of the wafer and correspondingly, the propagation wave vector of oscillation assumes real, zero, or imaginary values.

It is to be noted that the force is detected without appreciable mechanical movement except the molecular movement of the crystal lattice and an actual mechanical movement is provided only when one particular force transmitting device is used, and when a preset amount of force is exceeded. This will be disclosed in detail below.

Figure 3:
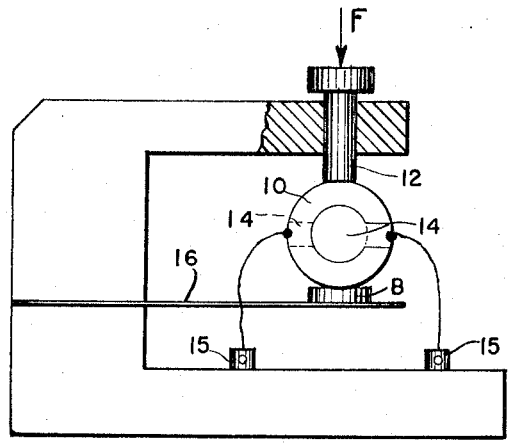
FIGURE 3 is a diagrammatic view of a first embodiment illustrating a single piezo-electric resonator.

With more particular reference to FIGURE 3, an embodiment of the present invention is diagrammatically illustrated wherein a piezo-electric resonator 10 which resonates in the shear mode is provided and a force is applied thereto by a force transfer means 12. The crystal plate is arranged to be supported by attaching it to a supporting block 13, for example, by cementing or soldering it to the block. The crystal is provided with electrodes 14 and lead connectors 15 are attached thereto. The crystal 10 is suitably positioned with respect to the force transfer means 12 and the support 13 so that the force will preferably be in the direction of the X-axis of the crystal, thereby to provide that maximum frequency shift per unit force is achieved. Support block 13 is mounted on a spring means 16 which is provided with such dimensions that the force transfer can not possibly damage the crystal itself. Thus, the spring means acts as an overload protection device. It should be noted, however, that other positioning of the direction of the force with respect to the crystal may be utilized if other functional relationships are desired.

Figure 4:
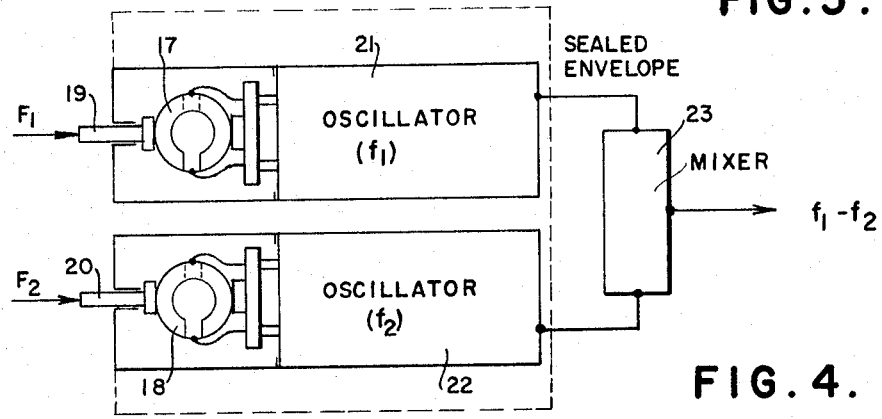
FIGURE 4 is a schematic diagram of another embodiment using two piezo-electric stabilized oscillators.

FIGURE 4 illustrates another embodiment of the invention wherein two piezo-electric stabilized oscillators are provided and includes two piezo-electric crystals 17 and 18 similar to the crystal in the FIGURE 3 embodiment. Force is applied to the respective crystals by force transfer means 19 and 20. Also, the crystals 17 and 18 are connected to comprise a part of piezo-electrically controlled electronic oscillators 21 and 22, which can be acted upon by a force either simultaneously or individually. The angle of attack of the force may be along the X-axis and either a compressional or tensional force, but any other angle or direction of attack may be used for transferring the force to the oscillators. Both of the oscillators have the stability of the primary or secondary time standard and the outputs of the oscillators are fed into a mixer 23 from which the difference frequency $f_1-f_2$ may be directly utilized or displayed. The components of the oscillators are chosen so that both oscillators have identical frequency temperature characteristics. The result of this is that the beat frequency remains constant during temperature variations. On the other hand, if the output is set to a zero beat, this condition would only change when a pressure is applied to at least one of the piezo-electric resonators as discussed previously.

In order to set the beat frequency to zero, a choice of several methods is available. This may be accomplished by:

(a) electrical means;

(b) prestressing one or both crystals to be at a suitable point on the stress-frequency characteristic to obtain identical frequencies;

(c) a slight variation of the ambient environment of the piezo-electric resonators to provide the zero beat frequency; or (d) placing small deposits of material on one of the crystals until the frequencies of both resonators are equalized.

The sensitivity of a device of this construction has proven to be in the order of magnitude comparable to the time accuracy of the time measurement which is possible using the piezo-electric stabilized oscillator as a standard. Static force measurements of the accuracy of one part in a million have been achieved for the first time.

Figure 5:
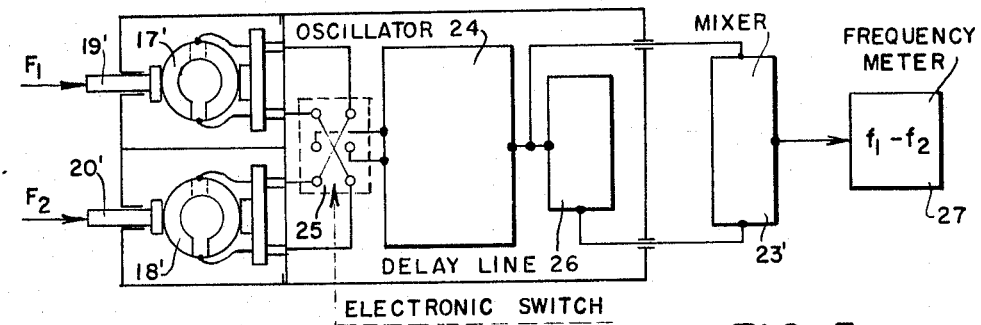
FIGURE 5 is a schematic diagram similar to FIGURE 4, illustrating a modified form thereof.

With more particular reference to FIGURE 5, an embodiment which is similar to that of FIGURE 4 is illustrated and wherein similar elements are designated with similar reference numerals but with primes added. A single oscillator 24 is used as are two piezo-electric quartz crystals 17' and 18'. The two quartz crystals are alternately switched to be connected with the oscillator 24, so that the electronic portions of the oscillators thereby defined are inherently identical. An electronic switch 25 is used for the alternate switching. In order to store oscillations produced by one crystal and utilize the stored information for producing a beat frequency with the oscillations produced by the second crystal, a delay line 26 is used for storing the oscillations of the first crystal for a certain period of time. Thus, the delay line 26 serves as a substitute for the second oscillator circuit. The delayed and direct oscillations produced by the two crystals are fed to the mixer 23' in a similar manner as is done in the embodiment of FIGURE 4 and the beat frequency $f_1-f_2$ would be proportional to the force or forces applied to the crystals. If desired a frequency meter 27 can be used to give a visual indication of the beat frequency.

It should be noted that the output of such devices is in digital form and therefore can be fed directly to a computer. Also, a constant output is provided which is advantageous for most applications.

Figure 6:
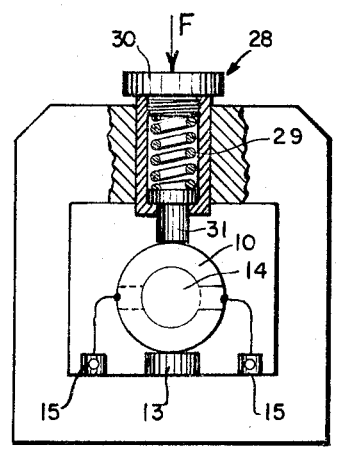
FIGURE 6 is a diagrammatic view illustrating the details of a force transfer mechanism.

Another form of the invention is illustrated in FIGURE 6 in which a force transfer mechanism 28 connected to apply force to the piezo-electric resonator crystal 10 is constructed to limit the maximum force which can be applied to the crystal. This is accomplished by connecting prestressed spring means such as a coil spring 29 between the crystal and the force. Whenever the force exceeds a certain preset value of the spring stress no further force increase will be possible since the compression spring will then be compressed and no excess force will be transferred to the crystal. This is accomplished in such a fashion that the spring 29 is compressed between force receiving element 30 and force transmitting element 31 to a predetermined force, such as 1 kg. or 2 kg. As long as the force F applied to the force transfer disk 30 is less than this preset value, there will be free transfer of the force to the crystal and it will also permit prestressing one or both of the crystals on the stress-frequency characteristic for setting a zero initial condition for the force sensor device. It should be noted, however, that such a zero frequency setting for the initial state of the force sensor device can also be provided electrically by tuning one or both oscillators slightly away from their center frequencies thereby to establish a zero beat output for an initial state.

Figure 7:
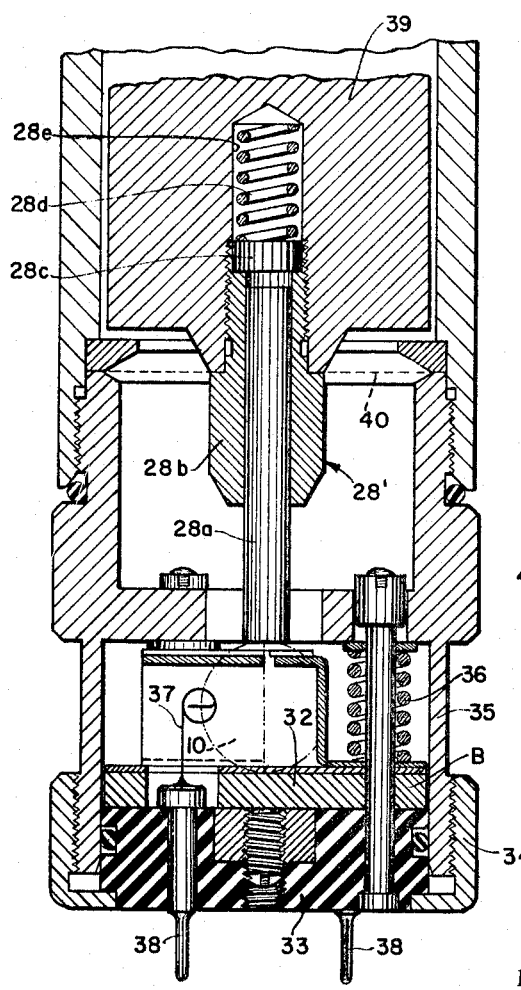
FIGURE 7 is a sectional view illustrating a detailed embodiment constructed in accordance with the present invention.

FIGURE 7 illustrates a more detailed embodiment incorporating the principles of the present invention, some of which have been described previously in connection with other figures. This sensor is an example of an inertial force sensor. The crystal 10 is indicated in phantom lines and is disposed between the force transfer mechanism which incorporates the prestressed spring means and a supporting block 32. This block is adjustable so that it can be set into a position where it gently touches the crystal. The entire crystal holder, which is mounted on an insulator block 33, can be moved up and down by means of adjusting screw 34 in the form of a collar and which is threaded to the housing 35. The screw 34 can be adjusted up and down against the spring 36 and may thereby bring the crystal into contact with the force transfer means 28' as described above.

Spring means 37 may be connected to the crystal electrodes using silver paste to provide an intimate contact between the crystal electrodes (not shown) and the spring means 37. Lead connectors 38 are connected to the spring means 37. FIGURE 7 shows only one half of the entire sensor unit. A mass 39 is suspended in the housing by spring means 40 such as by fine springs.

The force transfer means 28' includes a bore 28e formed in mass 39. A collar 28b is threaded into an end portion of the bore and a rod 28a is slidably disposed in the sleeve with one end resting on an edge of the crystal. A cap 28c is slidably disposed in the other end of sleeve 28b and a spring 28d is housed in bore 28e between the mass and cap 28c. Thus, an overload preventing device is provided, since, upon overload, mass 39 compresses spring 28d and the mass and rod 28a move relatively toward each other.

The exterior appearance of the device is any type of cylindrical tube. The lead connectors 38 of the crystals will appear on both ends, as shown in FIGURE 7. They can be connected to the electronic oscillator circuits and utilized in the manner indicated in FIGURES 4 and 5.

Figure 15:
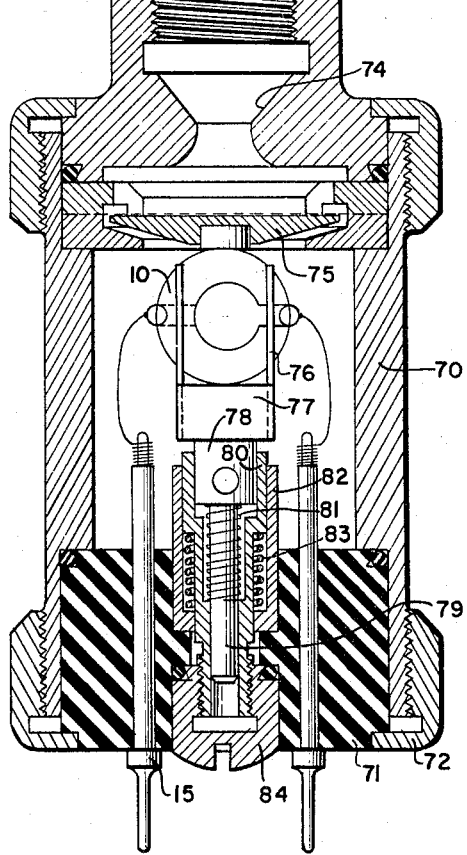
FIGURE 15 is a sectional view illustrating another detailed embodiment of the invention.

Another detailed embodiment of the invention is shown in FIGURE 15. A cylindrical casing 70 has a base 71 of insulating material which is held in place by sleeve 72 threaded to the end of casing 70. A head 73 is threaded onto casing 70 and has a central opening 74 therethrough and a force transfer disk 75.

The crystal 10 is mounted between holders 76 and is seated on a support 77 which is a stepped shaft having a first reduced portion 78 and a second reduced portion 79. A seat 80 slidingly accommodates the portions 78 and 79 of support 77 and an overload preventing spring 81 is disposed between the bottom of first reduced portion 78 and the base of seat 80. The spring 81 may be easily changed for varying the maximum load to be placed on the crystal.

Seat 80 is slidably mounted in and passes through cup element 82 and an adjusting spring 83 is interposed between seat 80 and cup element 82. An adjusting member 84 is rotatably mounted in the bottom of base 71 and the lower end of seat 80 is threadedly engaged therewith so that rotatably adjusting member 84 moves seat 80 up or down and thus changes the initial force against the crystal. Thus, member 84 may be used to set the device to a zero beat frequency.

Figure 8:
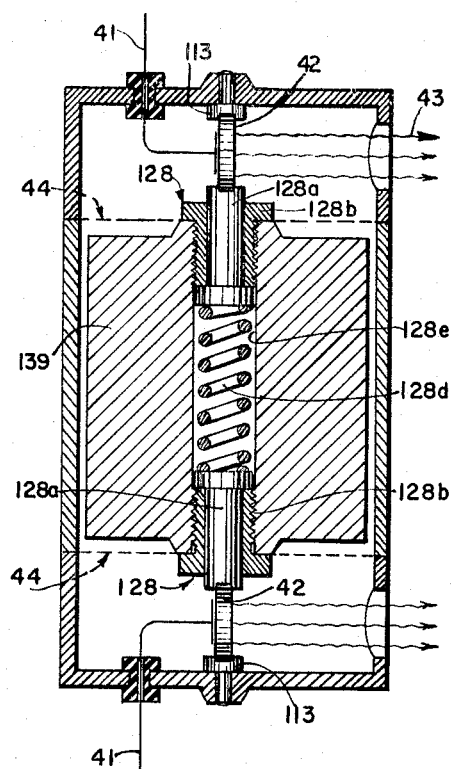
FIGURE 8 is a sectional view illustrating a detailed embodiment utilizing solid-state laser oscillators.

Another embodiment of the invention is illustrated in FIGURE 8 which incorporates the principles previously mentioned but using a solid-state laser oscillator. The sensor illustrated in the drawing is an inertial force sensor utilizing the relationship between the frequency change of a solid-state laser resonator, such as a light frequency-emitting diode which generates coherent stable frequencies if energized by a D.C. current on leads 41. Two diode light resonators 42 are mounted in a manner similar to the mounting of the piezo-electric resonators shown in FIGURE 7. The resonators are mounted between the supporting blocks 113 and the force transfer mechanisms 128 which are adjustable so that they may be set to be just gently touching the crystal in a manner similar to the embodiment of FIGURE 7. The transfer mechanism acts as a crystal holder and may be moved up and down by means of threaded sleeve 128b against a spring 128d.

Each force transfer means includes a capped rod 128a disposed in sleeve 128b. Sleeves 128b are threaded in bore 128e of mass 139 and prestressing is provided by adjustably threading sleeve 128b in the bore 128e. If the mass moves downwardly, force is transferred to the upper sleeve 128b to upper rod 128a through spring 128d to lower rod 128a which bears on lower element 42.

The frequency of light 43 which is emitted from the laser oscillator diodes 42 may be tuned by the application of a mechanical force similar to the quartz oscillators described previously. The two light frequencies 43 may be mixed in an optical or crystal mixer to produce a beat frequency similar to the previously described sensors. The device may be set to a zero beat frequency in a similar manner as described in connection with the piezoelectric crystal devices.

The frequency variation with temperature in this case is also automatically eliminated because the temperatures of the two laser diodes 42 vary in identical manner and therefore do not produce changes in the beat frequency. However, if the mass 139 suspended by the fine spring means 44 transfers inertial forces, such forces will act on the diodes, that is on the light resonators, in an opposite sense thereby causing a corresponding change in the beat frequency. Light-emitting laser diode resonators are currently available, for example, the GEE–402 Philco-type unit can be used which produces a wavelength of 0.9 micron with a very narrow bandwidth. This diode requires only a 1.2 v. forward voltage and generates a continuous coherent light oscillation. Because the frequency of light which is generated is about 10 million times higher than the radio frequency generated by a quartz oscillator, the sensitivity of this device is many orders of magnitude higher than the radio frequency device. Furthermore, this embodiment also has the advantage of being very small in size.

However, in every respect this device operates on the same principle as the device described in connection with FIGURE 7. That is, two oscillators are used, and the beat frequency of the oscillators is proportional to the force applied to the two crystals. Also, the temperature variation is eliminated because both crystals are subjected to the same change of frequency and therefore there is an identical shift of frequency, and as a result no change of the beat frequency results.

The embodiment of FIGURE 8 can be used in a similar manner as the device shown in FIGURE 7 and if three force sensors are used in three perpendicular directions and the information obtained from the sensors processed in a computer, such a three-dimensional sensor may be used as an inertial guidance system in space and in this manner an inertial compass may be made available similar to the action of gyros used for guidance purposes. The operation of such a system would be that if the movement of the guided device is perpendicular to the axis of movement of the mass and which passes through the crystals of the inertial force sensor, no force will act on the crystals and the beat frequency on the output will not change. However, if the lightest angle exists between the movement of the guided device and the axes of mass movement, a beat frequency signal would appear which may be used for correcting the path of movement. The choice of frequency is preferably high for obtaining the highest possible frequency change per unit force. A practical operating frequency would be about 30 megacycles. The use of a third or fifth overtone AT-cut crystal permits the application of a force up to a few kilograms. A force range of one part in a million has been achieved with an experimental device which has been tested. Other devices may be constructed using lower frequencies for higher force applications, and much higher frequencies up to a few hundred megacycles or higher can be used for the measurement of smaller forces.

Figure 16:
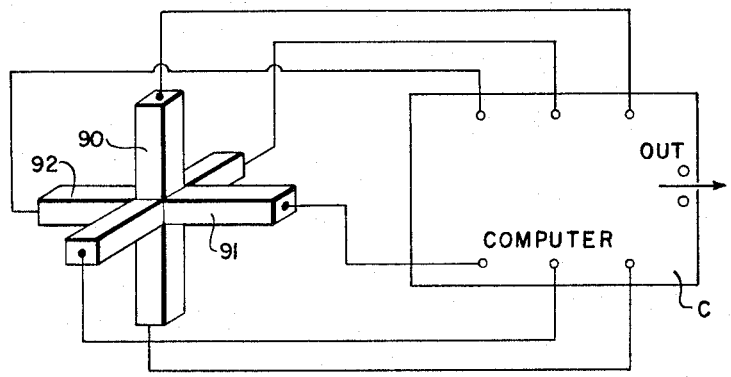
FIGURE 16 is a diagrammatic view of one application of the force sensor of the present invention for inertial guidance purposes.

FIGURE 16 shows schematically a three-dimensional inertial force sensor, for guidance purposes. The three force sensors 90, 91 and 92 are symbolically represented by the octahedral arrangements of three sensors the outputs of which are fed into a computer C which computes and stores the path of movement of the sensors from the output components of the sensors and permits the utilization of this information for guidance purposes.

Figure 17:
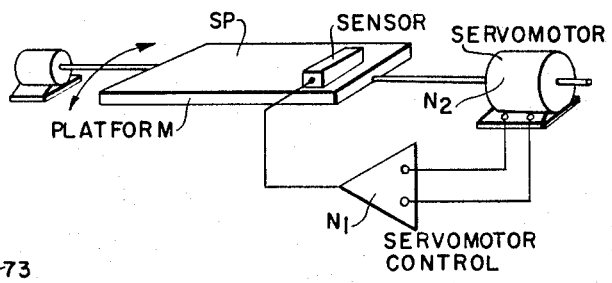
FIGURE 17 is a diagrammatic view of another application thereof.

Another example of the use of this device is as a control for a stable platform SP as shown in FIGURE 17. If it is assumed that the sensor of FIGURE 7 is disposed in a horizontal position, then no force will act on either of the crystals. If the device is disposed at a slight angle with respect to the horizontal, a force component is created on the crystals and the output beat frequency of the oscillators immediately indicates this fact. The beat output may be fed into a servo control mechanism ($N_1$) the output of which actuates a servomotor ($N_2$) to restore the horizontal position of the sensor until the output of the beat frequency again becomes zero and no correction control is generated.

Other applications are use as an electronic balance, gas pressure gauge, vacuum gauge, altitude gauge, and the measurement of extremely small distances, etc. Other uses are so numerous that only a few are mentioned here to exemplify the great variety of possible uses.

Figure 9:
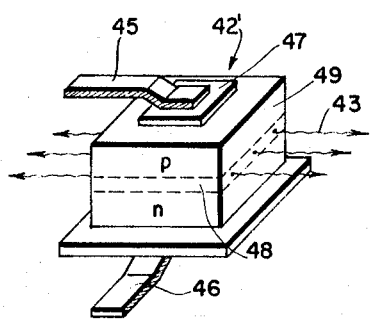
FIGURE 9 is a perspective view illustrating the detailed construction of the crystal laser oscillator.

In FIGURE 8 two diode light resonators 42 are indicated schematically and FIGURE 9 is a more detailed construction of a crystal laser resonator. Such a resonator 42' essentially comprises a highly doped pn-junction to which two leads 45 and 46 are connected by means of electrodes 47, forming ohmic contacts to the np-bulk regions. The junction 48 itself is represented by the region indicated by the dashed lines which is the depletion layer in which the laser oscillation and light amplification take place. The two opposite faces 49 are polished or cleaned so that a repeated reflection of the laser beam occurs. The current is fed to the device 42' through the leads 45 and 46 and to the junction 48, and an intensive light beam 43 is generated which leaves the polished surfaces 49. A light frequency of this device can be tuned by suitable application of a force as discussed and this makes the device useful in a manner similar to the piezo-electric oscillator. This, as well as other solid-state light oscillators, can be used with equal success such as ruby lasers.

Figure 10:
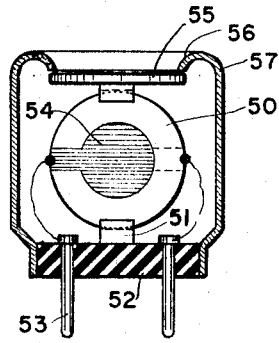
FIGURE 10 is a schematic sectional view of a simplified embodiment of a force measuring quartz disk.

FIGURE 10 is another embodiment of the invention which illustrates a simplified version of a force measuring quartz disk 50 in which the quartz disk is cemented on one side into a slot in a base 51 of a block 52. Electrical conductors are connected between external leads 53 and electrodes 54. On the top of the crystal a very light disk 55 is cemented to the quartz and it can be exposed to various forces. This disk 55 is disposed so as to substantially cover an opening 56 in a housing 57 in which the crystal is disposed. This arrangement is particularly useful for measuring vapor deposition performances in vacuums in which case the vapor deposits on the upper disk 55 and thus adds some weight to the disk and slightly changes the frequency of the crystal. Previous devices which had been used which were only generally similar thereto deposited the vapor to be measured directly on the electrodes and thus the devices had to be changed from time to time. In the novel arrangement of the present invention, the vapor or force does not act directly on the electrodes but rather on the rim of the quartz disk as described above and thus permits the measurement of evaporation or extremely small weights in such a manner that the high Q of the crystal would not change because the electrode thickness is not altered.

It is to be noted that in all of the devices described in connection with this invention, the fundamental novelty of the various embodiments of the invention is due to the discovery that shear mode vibrations do not extend very far beyond the electrode areas. In fact, they decay in an exponential manner outside of the electrode area and die out after a very short distance beyond the electrode area. This means that the transmission of force to the vibrating crystal can be accomplished by the application of a force on the rim of the quartz disk where the shear vibrations do not extend. As a result the transfer of force at these points does not essentially alter the high Q of the crystal vibration. This is in striking contrast to the case when the force is directly applied to the vibrating areas. The force sensor of the present invention could thus not be developed until this feature was recognized. This fact also permits the cementing of the crystal in a fixture to make low Q lead connections to the electrodes without changing the high Q resonance conditions existing under the electrodes. The novel transfer of force permits a development of an entirely new family of force sensors with an exceptionally high sensitivity and high Q.

Because of the above-mentioned fact that the shear resonance vibrations die out exponentially beyond the electrode area, two or more pairs of electrodes may be placed on a single resonating quartz in such a manner that they do not interact with each other. By this means it is possible to develop a differential force sensor or electronic balance using only a single crystal with two or more pairs of electrodes and with suitable means to transfer force to the crystal so as to change the beat frequency corresponding to the force applied.

Figure 11:
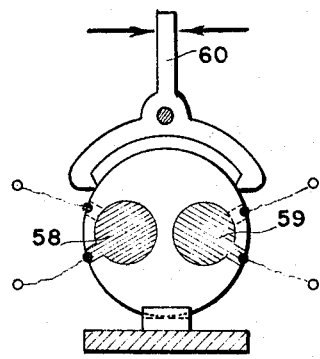
FIGURE 11 is a schematic view of a form of force sensor using two electrode pairs.
Figure 12:
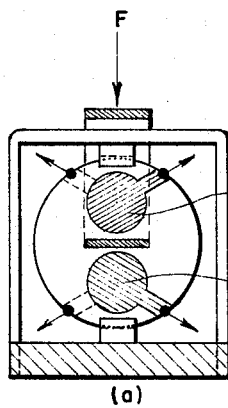
Figure 12:
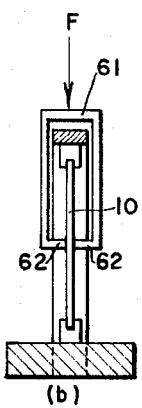

FIGURES 11 and 12 show two different variations of this type of force sensor. In FIGURE 11 two electrode pairs 58 and 59 are placed so as to be spaced from each other by a suitable distance so that the two places where resonating occurs do not interact and a transfer of force may be accomplished by a lever 60, shown in the drawing. This permits the application of a compressional force to one of the elements and a tensional force to the other elements thereby to cause opposite changes of frequency in the two resonating areas.

In FIGURES 12a and 12b another modification of a multiple resonating single quartz disk is illustrated wherein the force and the suspension of the crystal are so arranged that while the lower electrode pair 59' is subjected to a compressional force, the upper electrode pair 58' is subjected to an expansional force or tension. This is due to the fact that the force F which is indicated by the arrow is applied to a rectangular element 61 which has two lower spaced legs 62 facing each other and attached to the crystal 10 on opposite sides thereof. The differential effect is the same as described above. Multiple electrode pair units of this type indicate the distinct advantage that the fundamental frequencies of each electrode pair are nearly identical and the zero operation point can be set in a very easy manner.

Figure 13:
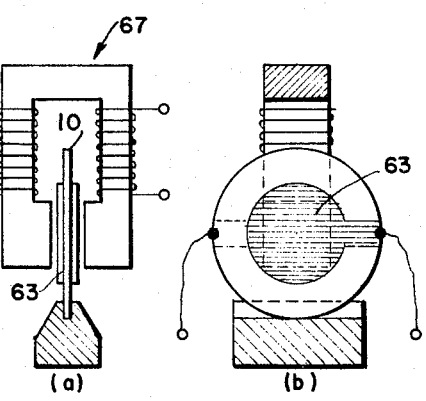
FIGURE 13 illustrates still another embodiment of a force sensor utilizing a magnetic force transfer device and which is shown in the front view in FIGURE 13a, and in side view in FIGURE 13b.

FIGURES 13a and 13b provide a further embodiment wherein a magnetic means of force transfer is provided. The crystal 10 is constructed having electrodes 63 thereon which are deposited in the form of a thin magnetic film. If the resonating quartz 10 is placed within the magnetic gap of a magnetic field producing apparatus 67, its fundamental frequency can be changed as a function of magnetization which, in turn, would depend on the magnetization current applied. This magnetization current could be derived directly from a force proportional to a force applied.

Figure 14:
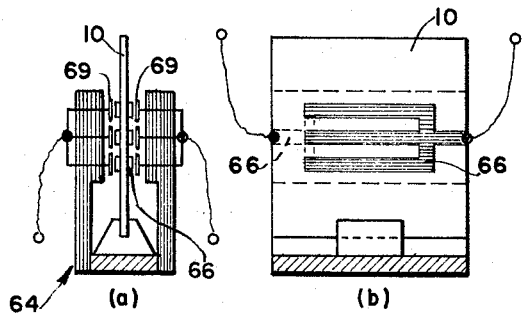

FIGURES 14a and 14b illustrate another force transfer arrangement for a crystal 10 wherein the electrodes 66 on the crystal are placed to one polarity and outside the crystal the two electrodes 69 represent a second polarity. If an electrostatic field is established between the external electrodes and crystal electrodes 66 which are energized by the exciting A.C. field, the established electrostatic field would change the frequency of vibration of crystal plate 10 and would thereby be indicative of the field applied. If this field is derived by a piezo-electric force sensor from a force then the change of frequency would be proportional to the force causing the piezo-electric field. A means 64 is provided for establishing an electrostatic field between the external electrodes 69 and the crystal electrodes 66.

Although this device is described essentially as a force sensor it is suited to measure molecular distances as remarked at various places in this disclosure. Since no difference in the principle and construction of the device is needed and the distance measurements can be performed directly with the force sensor described no further explanation appears to be necessary.

It will be understood that the above description of the present invention is susceptible to various modifications, changes, and adaptations, and the same are intended to be comprehended within the meaning and range of equivalents of the appended claims.

What is claimed is:

1. Means for detecting and controlling movement of an object in particular directions, comprising, two force sensors disposed in two mutually independent directions, each force sensor including: oscillator means including at least one solid-state element having an eigen frequency which varies when a force is applied thereto; means connected to said oscillator means for detecting a change in frequency when a force is applied to the element, the element being arranged with the oscillator means to oscillate in the shear mode; two means for transferring force to a portion of the element where the propagation wave vector of oscillation for a given direction of propagation is at an insignificant value and in the direction of the neutral plane of shear vibration in which plane particle displacement reverses itself; and a mass mounted to be easily movable by inertial forces in a certain direction and connected between said force transferring means so that the eelments and the mass are aligned to be affected by inertial forces in said direction.

2. Means for detecting and controlling movement of an object in particular directions, comprising three force sensors disposed in three mutually independent directions, each force sensor including: oscillator means including at least one solid-state element having an eigen frequency which varies when a force is applied thereto; means connected to said oscillator means for detecting a change in frequency when a force is applied to the element, the element being arranged with the oscillator means to oscillate in the shear mode; two means for transferring force to a portion of the element where the propagation wave vector of oscillation for a given direction of propagation is at an insignificant value and in the direction of the neutral plane of shear vibration in which plane particle displacement reverses itself; and a mass mounted to be easily movable by inertial forces in a certain direction and connected between said force transferring means so that the elements and the mass are aligned to be affected by inertial forces in said direction.

3. A force sensor comprising, in combination: oscillator means including at least one solid-state element in the form of a resonator having an eigen frequency which varies when a force is applied thereto; means connected to said oscillator means for detecting a change in frequency when a force is applied to the element, said oscillator means and said solid-state element being arranged so that the element oscillates in the shear mode, and means for transferring forces below a predetermined maximum to said element on a portion thereof where the propagation wave vector of oscillation for a given direction of propagation is at an insignificant value and in the direction of the neutral plane of shear vibration in which plane particle displacement reverses itself, whereby the frequency may be changed by the application of force without changing the Q of the resonator, said force transferring means including a force applying element in contact with said element, a force receiving element movable relatively toward and away from said force applying element, and a spring disposed between said force elements.

4. A force sensor as defined in claim 3 wherein said force transferring means further includes means for adjustably prestressing said spring to provide for adjusting of the element so it may operate in the middle range of its force-frequency characteristic to provide an indication of both compressional and extensional forces.

5. A force sensor as defined in claim 3 wherein said spring is prestressed.

6. A force sensor comprising, in combination: first oscillator means including at least one solid-state element having an eigen frequency which varies when a force is applied thereto; second oscillator means including a solid-state element for comparison purposes with said first oscillator means; and mixing means connected to said oscillator means to receive the outputs therefrom which are indicative of the frequency difference between the elements, for producing, when a force is applied to at least one of the elements, a difference frequency which is proportional to the magnitude of the applied force, and a single crystal wafer comprising both of said solid-state elements of said first and second oscillator means.

7. A force sensor comprising, in combination: oscillator means including two solid-state elements having identical frequency-temperature characteristics and each having an eigen frequency which varies when a force is applied thereto; and means connected to the oscillator means to receive the outputs therefrom which are indicative of the frequency of the elements for producing, when a force is applied to at least one element, a difference frequency which is proportional to the applied force, said elements being injection lasers formed on polished chips of semiconductor material by pn-junctions.

8. A force sensor comprising, in combination: oscillator means including two solid-state elements having identical frequency-temperature characteristics and each having an eigen frequency which varies when a force is applied thereto; and means connected to the oscillator means to receive the outputs therefrom which are indicative of the frequency of the elements for producing, when a force is applied to at least one element, a difference frequency which is proportional to the applied force, oscillator means including only one electronic oscillator circuit, an electronic switch for alternately connecting the respective resonators to said electronic oscillator circuit, and a delay line for storing the output of one resonator and the electronic oscillator circuit for a sufficient period of time that it may be fed to the difference frequency producing means simultaneously with the output of the other resonator and the electronic oscillator circuit.

9. A device for controlling a stable platform, comprising in combination: a force sensor including: oscillator means including at least one solid-state element having an eigen frequency which varies when a force is applied thereto; means connected to said oscillator means for detecting a change in frequency when a force is applied to the element, the element being arranged with the oscillator means to oscillate in the shear mode; two means for transferring force to a portion of the element where the propagation wave vector of oscillation for a given direction of propagation is at an insignificant value and in the direction of the neutral plane of shear vibration in which plane particle displacement reverses itself; and a mass mounted to be easily movable by inertial forces in a certain direction and connected between said force transferring means so that the elements and the mass are aligned to be affected by inertial forces in said direction, said force sensor being mounted on a stable platform mounted to have its plane rotatable to be inclined with respect to the horizontal, said sensor being parallel to the plane thereof with said certain direction disposed at right angles to the axis of rotation of the platform; servomotor means connected to drive said platform about its axis of rotation in either direction; and servomotor control means connected to the output of said force sensor and to the input of said servomotor means for controlling the platform via said servomotor means to be disposed horizontally in response to the output of said force sensor.

10. An inertial guidance device comprising in combination: the three force sensors defined in claim 2 and disposed in three mutually perpendicular directions; and computer means connected to receive the outputs of said force sensors for use in determining movement of an object.

11. A force sensor comprising, in combination: oscillator means including at least one solid-state element in the form of a resonator having an eigen frequency which varies when a force is applied thereto; means connected to said oscillator means for detecting a change in frequency when a force is applied to the element, said oscillator means and said solid-state element being arranged so that the element oscillates in the shear mode, and means for transferring forces below the predetermined maximum to said element on a portion thereof where the propagation wave vector of oscillation for a given direction of propagation is at an insignificant value and in the direction of the neutral plane of shear vibration in which plane particle displacement reverses itself, whereby the frequency may be changed by the application of force without changing the Q of the resonator, said force transferring means including a force applying element in contact with said element, a support for said solid-state element, a seat in which said support is movable so that said seat and said force applying element can move relatively toward and away from each other, and a spring disposed between said seat and said support.

References Cited by the Examiner

UNITED STATES PATENTS

| 1,975,516 | 10/1934 | Nicolson. | |
| 2,315,756 | 4/1943 | Warner | 73—398 X |
| 3,033,043 | 5/1962 | Runft | 73—517 |
| 3,045,491 | 7/1962 | Hart | 73—398 |

FOREIGN PATENTS

| 529,035 | 8/1956 | Canada. |
| 861,325 | 2/1961 | Great Britain. |

RICHARD C. QUEISSER, *Primary Examiner.*

C. A. RUEHL, *Assistant Examiner.*